United States Patent
Huang

(10) Patent No.: US 6,215,601 B1
(45) Date of Patent: Apr. 10, 2001

(54) HEAD BELT OF HEAD MAGNIFYING GLASS

(75) Inventor: Tsung-Hui Huang, Tai Ping (TW)

(73) Assignee: GEM Optical Co., Ltd., Taichung (TW)

( * ) Notice: Subject to any disclaimer, the term of this patent is extended or adjusted under 35 U.S.C. 154(b) by 0 days.

(21) Appl. No.: 09/376,595

(22) Filed: Aug. 18, 1999

(30) Foreign Application Priority Data

Sep. 28, 1998 (CN) ............................................ 98 2 07451.4

(51) Int. Cl.[7] ............................. G02B 27/02; A41D 13/00
(52) U.S. Cl. .................................................. 359/802; 2/417
(58) Field of Search .................................... 359/802, 809, 359/810, 811, 818, 822, 829, 830; 2/6.3, 410, 417, 418, 419, 452, 453, 10, 15; 24/17 A, 3.13, 30.5 P, 188, 170, 190

(56) References Cited

U.S. PATENT DOCUMENTS 5,431,365 * 7/1995 Feng ...................................... 248/683
5,467,508 * 11/1995 Feng ................................... 24/68 SK
5,844,656 * 12/1998 Ronzani et al. ...................... 351/158
6,116,729 * 9/2000 Huang ..................................... 351/41

* cited by examiner

Primary Examiner—Georgia Epps
Assistant Examiner—Saeed Seyrafi
(74) Attorney, Agent, or Firm—Jiawei Huang; J C Patents

(57) ABSTRACT

A head belt of head magnifying glass includes a first and a second head belt set up at both sides of the fixer of magnifying glass. More than one buttoning holes are made on the first head belt vertically. A buttoning seat stretches out from the second head belt. A vacancy forms between said buttoning seat and the second head belt. A through hole is made at the inner and of the buttoning seat and a movable plate is fixed on the buttoning seat. The movable plate is pivoted by its both sides at near the middle part of the lateral sides of buttoning seat. A clamping key is established at the end where the movable plate corresponds with the through hole of buttoning seat and a spring plate is built at the other end. It is easy adjustable by inserting the first bead belt in the above mentioned vacancy and buttoning up the clamping key with the buttoning hole and durableness of head belt is thus achieved.

4 Claims, 7 Drawing Sheets

HEAD BELT OF HEAD MAGNIFYING GLASS

BACKGROUND OF THE INVENTION

The present invention relates to a head belt of head magnifying glass, and more particularly to an easy adjustable and more durable head belt construction.

With the quick development of industries in recent years, every industry gradually tends to the practical development of reducing volume and enabling all-around functions of products. Almost any industry such as precise electronic industry, precise mould manufacturing industry, seal caving industry, composing and typing industry, precise spring, etc., all develops towards said direction without exception. In the course of manufacturing of those precise industries workers have to use head magnifying glass to magnify work piece for easy processing. FIG. 1 shows a conventional head magnifying glass 10. A first head belt 20 and a second head belt 30 stretch backward from each side of fixer 102 for fixing magnifying glass 101, respectively. A female sticking belt 201 is sewed up on the inner side of the first head belt 20, while a male sticking belt 301 is sewed up on the outer side of the second head belt 30. When the male sticking belt 301 is made stick to the female sticking belt 201, the first belt 20 and the second head belt 30 get fixed together, forming a ring putting fast on the user's head and enabling him to process the work piece which is magnified by the magnifying glass 101 on fixer 102. However, because of the different sizes of heads of users as well as sticking up and/or coming off of male sticking belt 301 and female sticking belt 201 while putting on and/or taking off the magnifying glass, villus on male sticking belt 301 and female sticking belt 201 will come off and become less through repeated use, leading to low sticking effect. As a result, the first head belt 20 and the second head belt 30 can not be combined closely and thus lose their effect. For this, the user has to get a new head belt for replacement, and surely, this is disadvantageous in use.

SUMMARY OF THE INVENTION

The major object of the invention is to provide a modified head belt of head magnifying glass to resolve the problem stated above. A movable plate is set up on the buttoning hole made on the first head belt. It separates from the buttoning hole due to lever movement while pressing its one end, and it remains buttoned up well with the buttoning hole when it is not pressed down. After repeated operation of combining and separating the movable plate and buttoning hole, nice buttoning is still kept so that convenient adjustment and longer duration of head belt are achieved.

The object of the invention is carried out by providing a head belt of head magnifying glass, wherein a first head belt and a second head belt stretch backward from each side of the fixer of head magnifying glass respectively.

More than one vertical buttoning holes are made at certain space along said first head belt.

A stretching out buttoning seat is set up at certain place of said second head belt with a vacancy formed between said buttoning seat and the second head belt; a through hole is made at the inner end of buttoning seat and a movable plate is fixed on the buttoning seat; said movable plate is pivoted by the part near the middle of each side of buttoning seat; a clamping key is established at one end of the movable plate corresponding the through hole of the buttoning seat and a spring plate is set up at the other end of the movable plate.

This allows the first head belt to be inserted into the vacancy between the second head belt and the buttoning seat, and by utilizing the clamping key of the movable plate penetrating the through hole of the buttoning seat to button up in the buttoning hole of the first head belt, the first and second head belts are closely combined. As said movable plate is pivoted at the buttoning seat, when its outer end is pressed down, it is able to revolve with the pivoted part as its fulcrum to have the end where the clamping key is placed rise so that the clamping key separates from the buttoning hole of the first head belt so as to allow the first head belt to adjust its position along the second head belt or separate from the second head belt. Thus the object of easy adjustment and durable effect is acquired.

There is a binding sleeve on the second head belt used to bind the end of the first head belt.

A pivot axle is built on each side of the movable plate near its middle and said pivot axle is inserted in the pivot hole on each side of the buttoning seat to make the movable plate combined with the buttoning seat Said first head belt and said second head belt are respectively pivoted at the end of one of the two sides of the fixer of head magnifying glass.

The beneficial effect of adopting the above-mentioned technical scheme is apparent: Since said head magnifying is in the shape of a ring by buttoning up the first and second head belts, it allows adjusting the size of combined ring according to the needs of users and/or separating them from each other. Besides, as the first and second head belts of said head belt are inked linked together by means of a buttoning movable plate, such construction will keep very nice buttoning effect after many times of separating and buttoning. So that the efficacy of elongating the duration of use of the head belt is achieved.

DENOTATION OF MARKING NUMBERS:

Conventional head magnifying glass part:

| | |
|---|---|
| 10-head magnifying glass | 101-magnifying glass |
| 102-fixer | 20 the first head belt |
| 201-female sticking belt | 30-the second head belt |
| 301-male sticking belt | |

The present invention part:

| | |
|---|---|
| 1-head magnifying glass | 2-the first head belt |
| 21-buttoning hole | 11-fixer |
| 31-binding sleeve | 3-the second head belt |
| 41-pivot hole | 4-buttoning seat |
| 5-vacancy | 42-through hole |
| 61-pivot axle | 6-movable plate |
| 63-spring plate | 62-lamping key |

DETAILED DESCRIPTION OF THE PREFERRED EMBODIMENTS

Now the present invention will be described in detail by embodiments thereof shown in the attached drawings.

Figure 1:
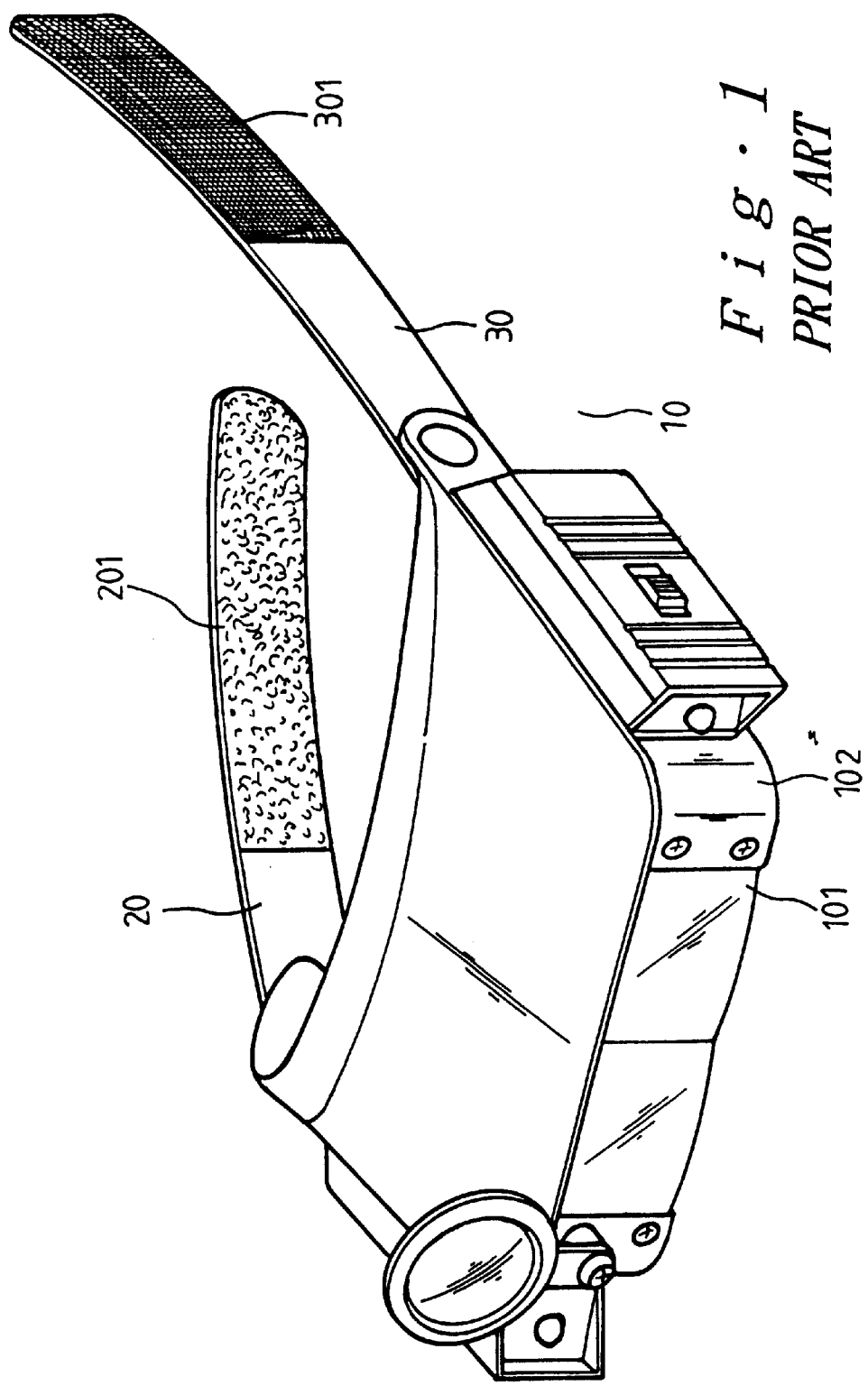
FIG. 1 is a perspective view showing a conventional head magnifying glass.
Figure 2:
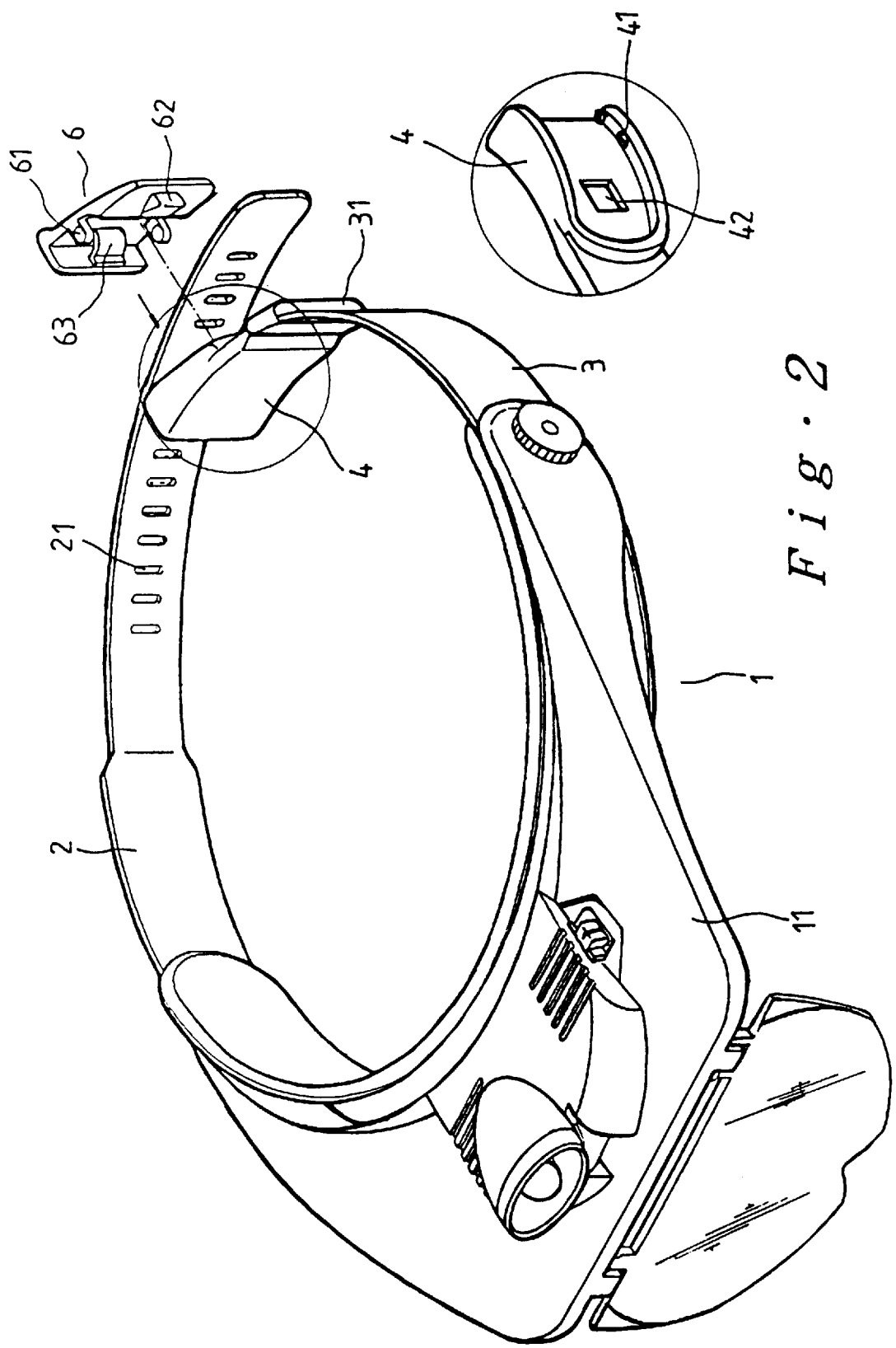
FIG. 2 is an exploded view of the present invention.

In FIG. 2, a first head belt 2 and a second head belt 3 are set up respectively on the backward end of one of the two sides of fixer 11 of head magnifying glass 1 of the invention. Said first head belt 2 is pivoted at the end of one side of the fixer 11 of head magnifying glass and more than one vertical buttoning holes 21 are made at certain space on said first head belt 2. Said second head belt is pivoted at the end of the other side of fixer 11 of head magnifying glass and a buttoning seat 4 stretches out from proper part of the end to leave a vacancy 5 (See FIG. 3) formed between said buttoning seat 4 and the second head belt 3; a pivot hole 41 is made at the middle of each side of buttoning seat 4 and a through hole 42 is set up at the inner end of buttoning seat 4. Besides, on said buttoning seat 4 is fixed a movable plate 6 and on each side of said movable plate 6 corresponding pivot hole 41 of buttoning seat is set up a pivot axle 61 respectively. A clamping key 62 is established on the end of movable plate 6 corresponding to through hole 42 of buttoning seat 4 and on the other end of the movable plate 6 is set up a spring plate 63. Again, there is a binding sleeve 31 on said second head belt 3 to bind the end of the first head belt while buttoning up with the second head belt.

Figure 3:
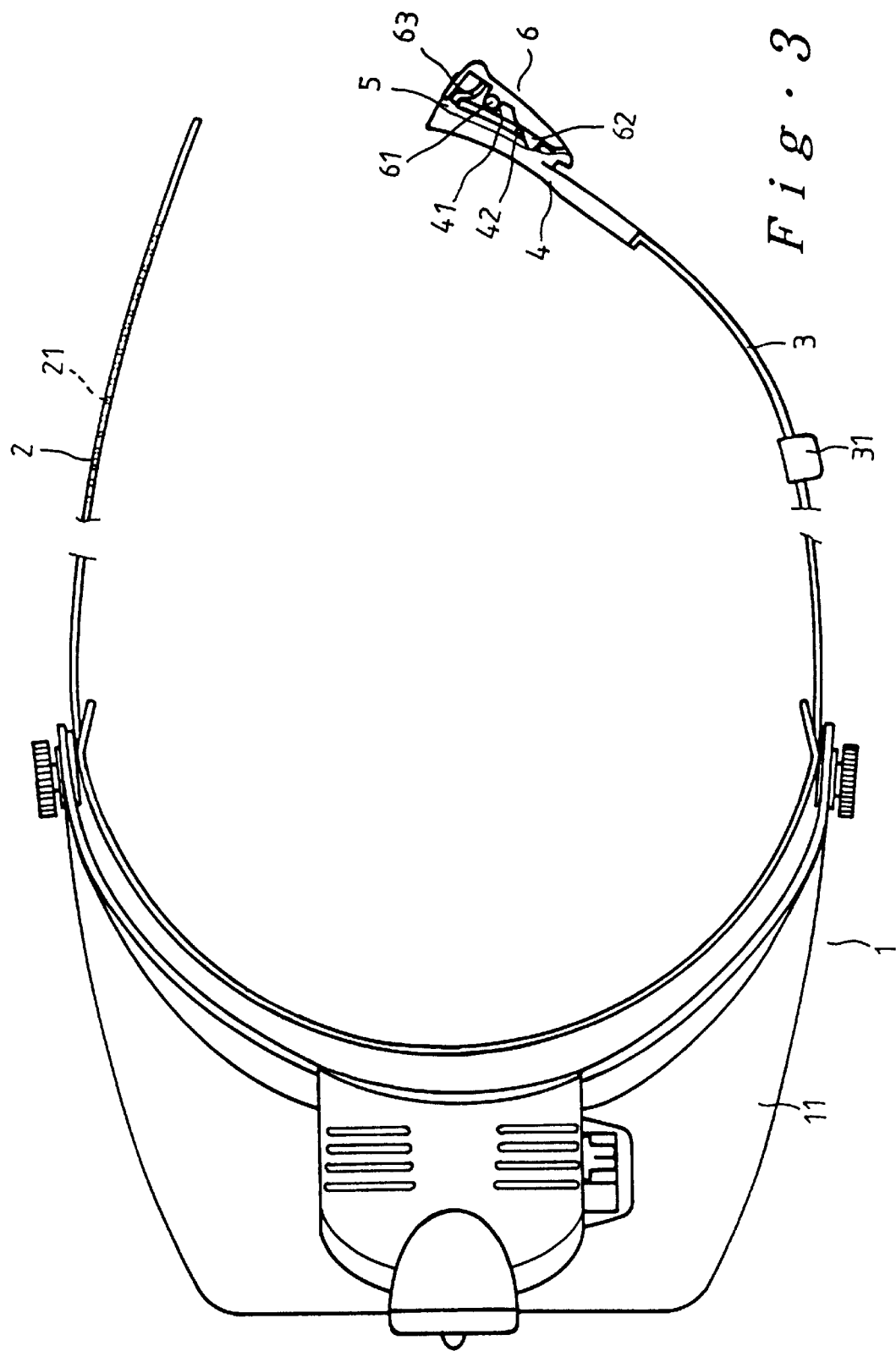
FIG. 3 is a top view of the head magnifying glass showing the composition view of the invention.

In FIG. 3, while assembling, pivot axle 61 is put into the pivot hole 41 of buttoning seat 4 to enable movable plate 6 to conduct a lever movement with said pivot axle 61 as fulcrum. When the end of movable plate 6, where spring plate 63 is set up, is pressed, one end of movable plate 6 moves downward by the pressure of spring plate 63 and the other end, where clamping key 62 is placed, turns upwards due to the lever movement. Whereas, when the end, where spring plate 63 lies, is not pressed, the other end, where there is spring plate 63, returns to its normal position by utilizing release of elasticity of spring plate 63, and at this time, the other end, where clamping hey 62 exists, of movable plate 6 moves downward to achieve the object of the lever movement.

Figure 4:
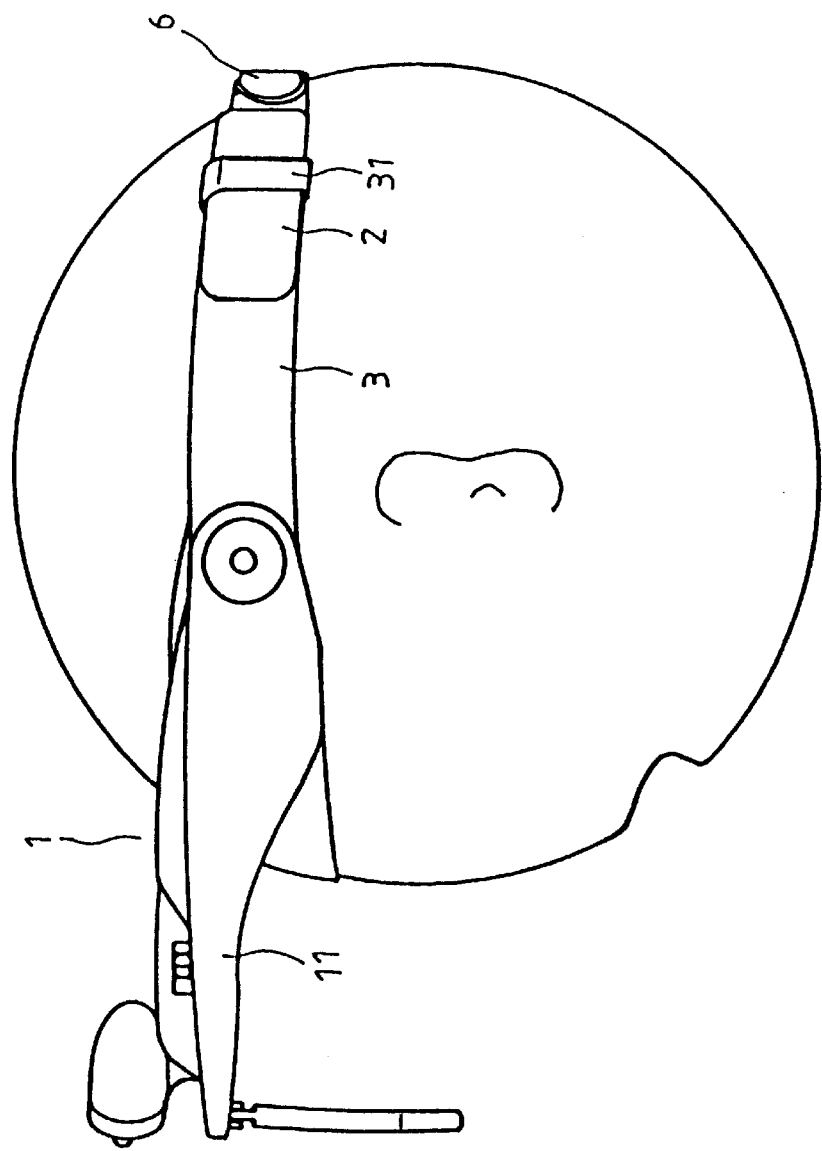
FIG. 4 is a side view of the head magnifying glass showing the use of the invention.
Figure 5:
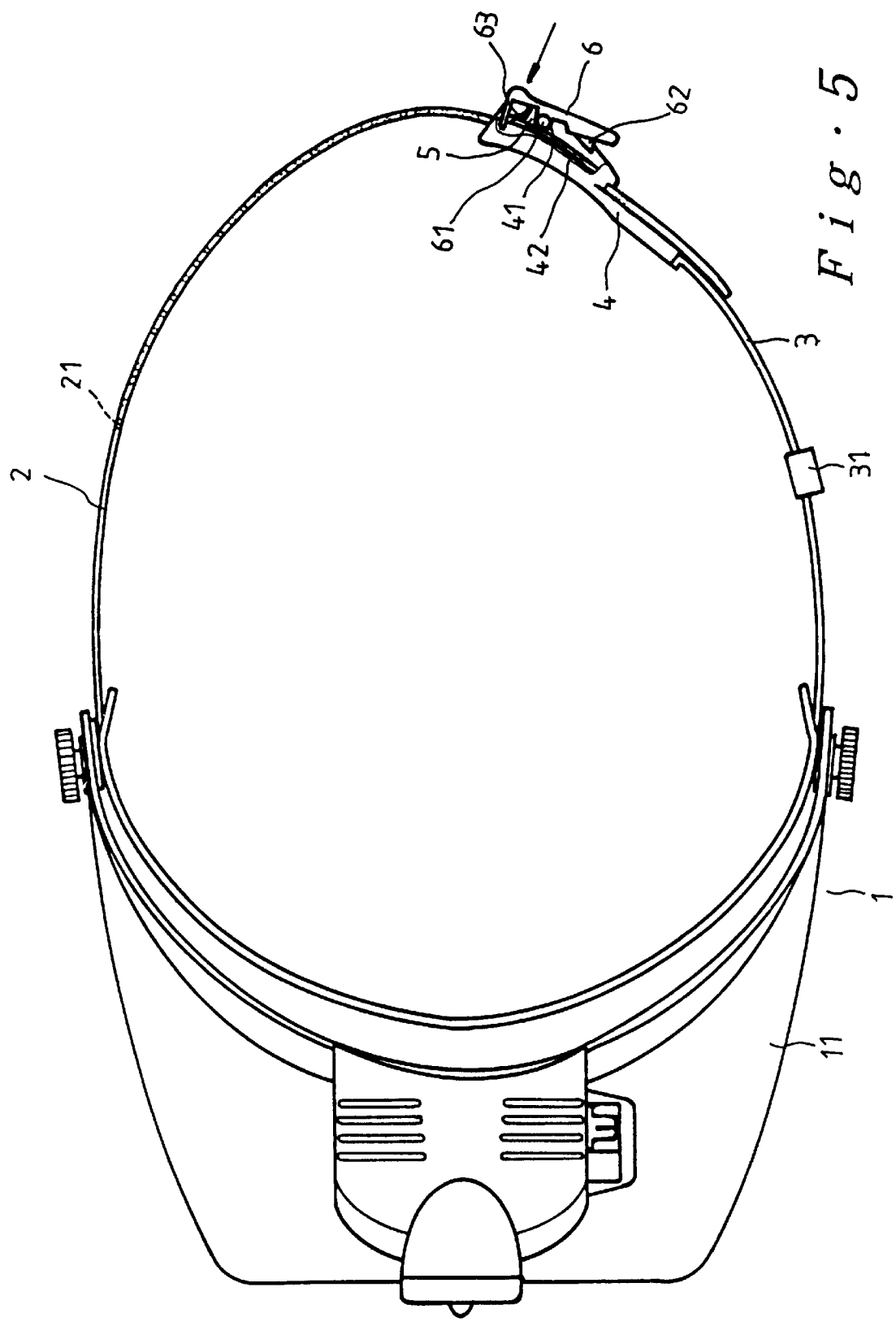
FIG. 5 is a top view of the head magnifying glass showing the operation of the invention.
Figure 6:
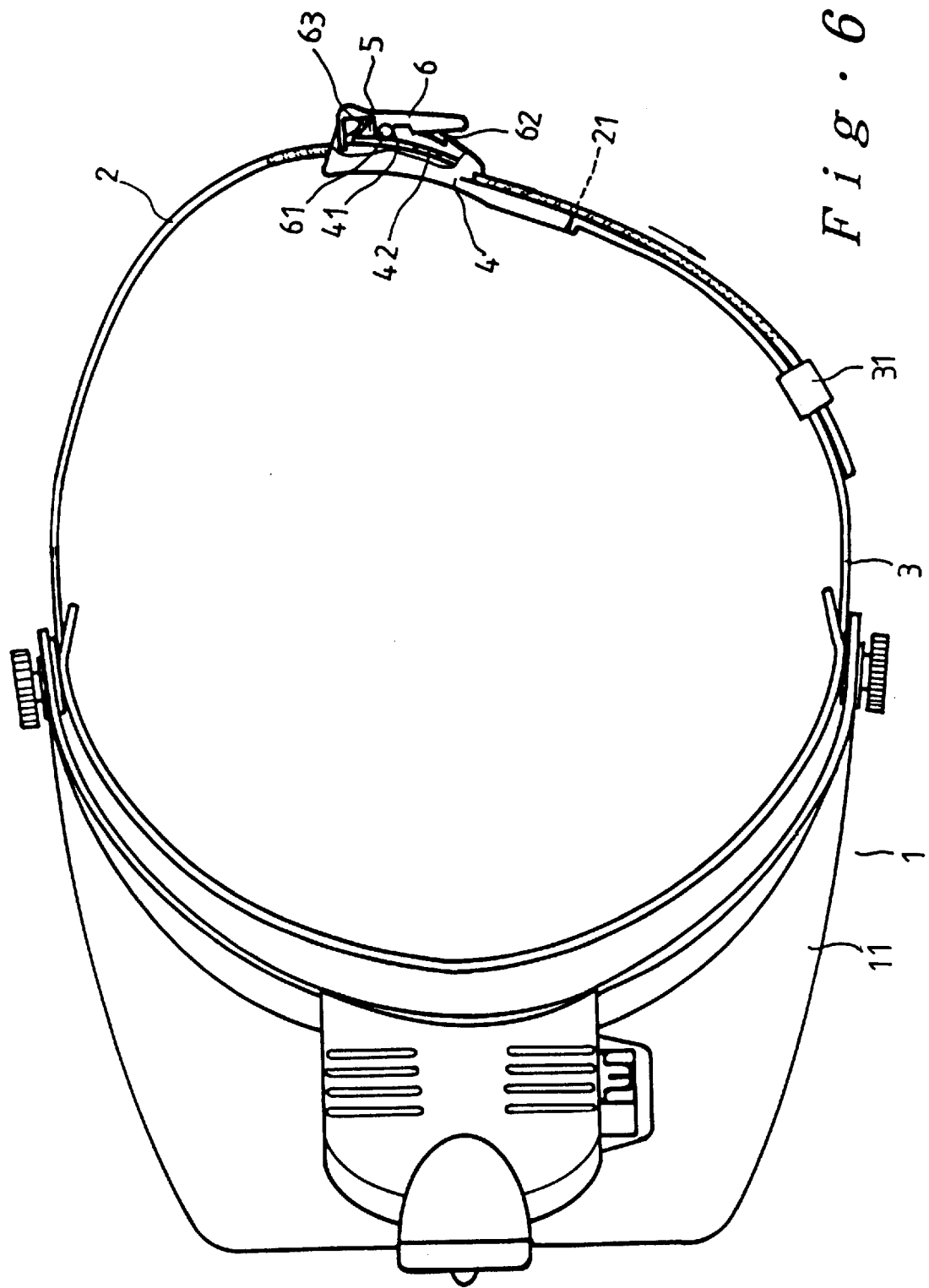
FIG. 6 is a top view of the head magnifying glass showing the operation of the invention.
Figure 7:
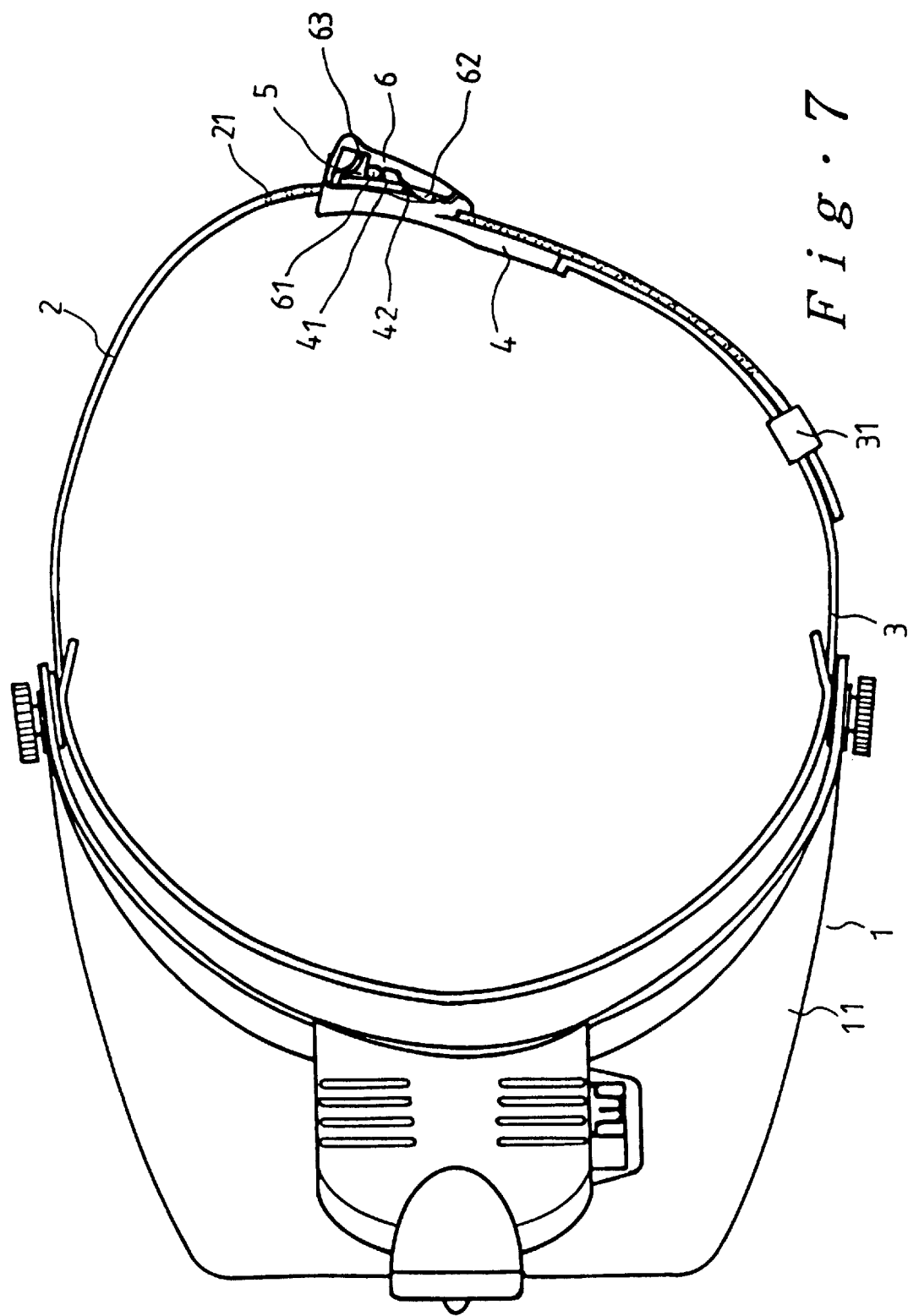
FIG. 7 is a top view of the head magnifying glass showing the operation of the invention.

In FIG. 4, when the first head belt 2 is inserted in the vacancy 5 between the second head belt 3 and buttoning seat 4, by utilizing buttoning up clamping key 62 of movable plate 6 and buttoning hole 21 of the first head belt 2, the first head belt 2 and the second head belt 3 are combined to form a ring for sleeving user's head 12. It is seen from FIG. 5 that in order to adjust the size of ring formed by the first head belt 2 and second head belt 3 to fit user's head, the end with spring plate 63 of said movable plate 6 is pressed down to allow movable plate 6 to conduct a lever movement to turn up the other end with clamping key 62 so that the clamping key 62 will be disengaged from the buttoning hole 21 of the first head belt 2. In FIG. 6, it is seen, after having been disengaged from buttoning by movable plate 6 of the second head belt 3, the first head belt 2 is able to move freely in vacancy 5 to form an intended ring size by adjusting its combining position with the second head belt 3 or to be pulled out from vacancy 5. It is seen from FIG. 7 that when the first head belt 2 is adjusted to the proper position in vacancy 5, the user no longer presses on the end with spring plate 63 of movable plate 6 to allow said end of movable plate 6 to move upwards by means of the elasticity of spring plate 63, and meanwhile, movable plate 6 conducts lever movement to drive the other end with clamping key 62 to move downward to have it penetrate the through hole 42 of buttoning seat 4 and button in the buttoning hole 21 of the first head belt 2 so as to attain the object of adjusting the head ring size and/or combining or separating the two head belts.

To sum up, owing to the fact that the head belt of conventional head magnifying glass is stuck up by sticking belts, through times of coming off and sticking up in use, the sticking effect between female and male sticking belts will turn worse and even lose stickness, and as a result, the ring size of head belt can not be fixed so that the effect of usage will finally lose. Nevertheless, buttoning method is used in the present invention so it will keep nice buttoning effect after many times of separating and buttoning up in use. The head belt will be more durable for use and improve realistic effect compared with conventional ones.

I claim:

1. A head belt for a head magnifying glass, wherein the head magnifying glass has a fixer with a first end and a second end, the head belt comprising:

a first head belt coupled to the first end of the fixer;

a second head belt coupled to the second end of the fixer, wherein more than one vertical buttoning holes are formed on the first head belt;

only one buttoning seat coupled to the second head belt and forming a vacancy between the buttoning seat and the second head belt, wherein a through hole is formed in the buttoning seat;

a movable plate pivotally coupled to the buttoning seat, wherein a clamping key is set up at one end of the movable plate for engaging with the through hole of the buttoning seat, and a spring plate is established at the other end of the movable plate.

2. The head belt according to claim 1, wherein there is a binding sleeve on the second head belt used to bind up the first head belt.

3. The head belt according to claim 1, wherein there is a pivot axle at a middle portion of the movable plate, and the pivot axle is put in a pivoting hole on a lateral side of the buttoning seat to pivotally connect the movable plate with the buttoning seat.

4. The head belt according to claim 1, wherein the first belt and the second, head belt are pivotally connected to the first end and the second end of the fixer of the head magnifying glass, respectively.

* * * * *

(12) EX PARTE REEXAMINATION CERTIFICATE (9918th)
United States Patent
Huang

(10) Number: US 6,215,601 C1
(45) Certificate Issued: Nov. 1, 2013

(54) HEAD BELT OF HEAD MAGNIFYING GLASS

(75) Inventor: Tsung-Hui Huang, Tai Ping (TW)

(73) Assignee: Carson Optical, Inc., Hauppauge, NY (US)

Reexamination Request:
No. 90/012,574, Sep. 14, 2012

Reexamination Certificate for:
Patent No.: 6,215,601
Issued: Apr. 10, 2001
Appl. No.: 09/376,595
Filed: Aug. 18, 1999

(30) Foreign Application Priority Data

Sep. 28, 1998 (CN) .................................. 98 2 07451

(51) Int. Cl.
*G02B 7/00* (2006.01)
*G02B 25/00* (2006.01)
*G02B 25/02* (2006.01)
*G02C 3/00* (2006.01)
*G02C 3/02* (2006.01)

(52) U.S. Cl.
USPC ............................................. 359/802; 2/417

(58) Field of Classification Search
None
See application file for complete search history.

(56) References Cited

To view the complete listing of prior art documents cited during the proceeding for Reexamination Control Number 90/012,574, please refer to the USPTO's public Patent Application Information Retrieval (PAIR) system under the Display References tab.

*Primary Examiner* — Margaret Rubin

(57) ABSTRACT

A head belt of head magnifying glass includes a first and a second head belt set up at both sides of the fixer of magnifying glass. More than one buttoning holes are made on the first head belt vertically. A buttoning seat stretches out from the second head belt. A vacancy forms between said buttoning seat and the second head belt. A through hole is made at the inner and of the buttoning seat and a movable plate is fixed on the buttoning seat. The movable plate is pivoted by its both sides at near the middle part of the lateral sides of buttoning seat. A clamping key is established at the end where the movable plate corresponds with the through hole of buttoning seat and a spring plate is built at the other end. It is easy adjustable by inserting the first bead belt in the above mentioned vacancy and buttoning up the clamping key with the buttoning hole and durableness of head belt is thus achieved.

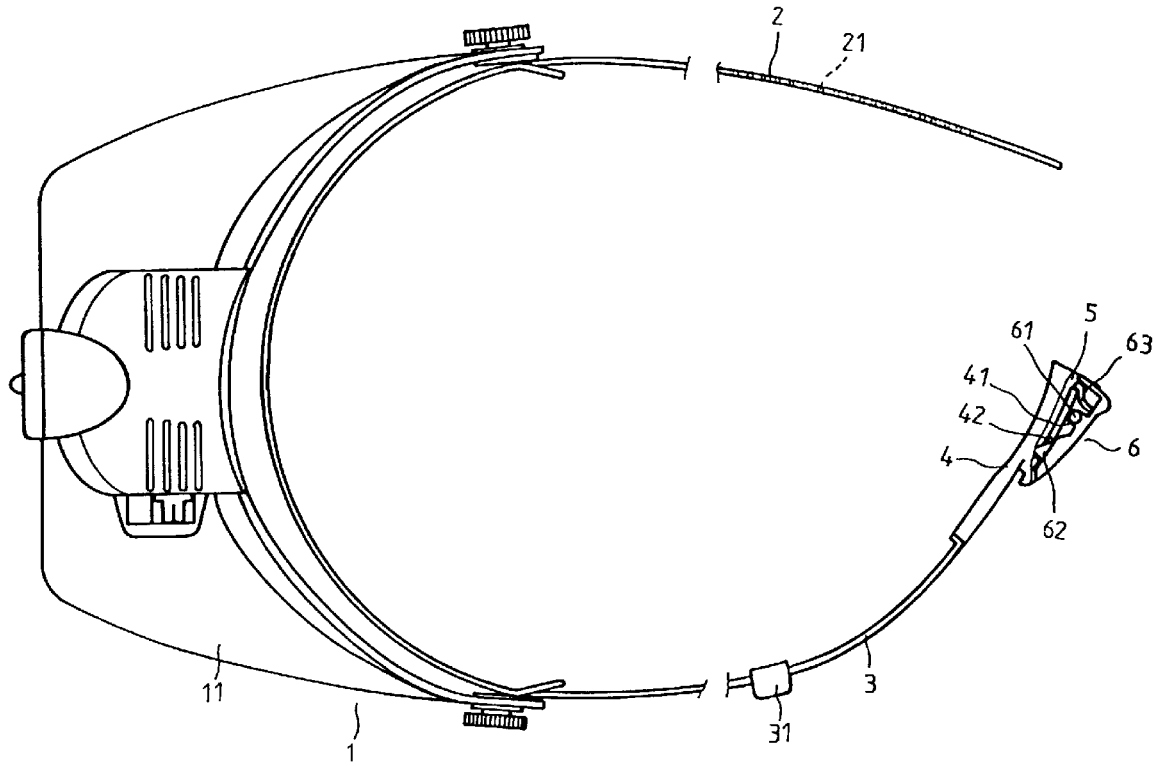

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claims 2-4 are determined to be patentable as amended.

New claims 5, 6 and 7 are added and determined to be patentable.

2. The head belt according to claim [1] *4*, wherein there is a binding sleeve on the second head belt used to bind up the first head belt.

3. The head belt according to claim [1] *4*, wherein there is a pivot axle at a middle portion of the movable plate, and the pivot axle is put in a pivoting hole on a lateral side of the buttoning seat to pivotally connect the movable plate with the buttoning seat.

4. [The head belt according to claim 1,] *A head belt for a head magnifying glass, wherein the head magnifying glass has a fixer with a first end and a second end, the head belt comprising:*
  *a first head belt coupled to the first end of the fixer;*
  *a second head belt coupled to the second end of the fixer, wherein more than one vertical buttoning holes are formed on the first head belt;*
  *only one buttoning seat coupled to the second head belt and forming a vacancy between the buttoning seat and the second head belt, wherein a through hole is formed in the buttoning seat;*
  *a movable plate pivotally coupled to the buttoning seat, wherein a clamping key is set up at one end of the movable plate for engaging with the through hole of the buttoning seat, and a spring plate is established at the other end of the movable plate;*
  *wherein the first belt and the second*[.] *head belt are pivotally connected to the first end and the second end of the fixer of the head magnifying glass, respectively.*

*5. A head belt for a head magnifying glass, wherein the head magnifying glass has a fixer with a first end and a second end, the head belt comprising:*
  *a first head belt coupled to the first end of the fixer;*
  *a second head belt coupled to the second end of the fixer, wherein a plurality of vertical buttoning holes are formed into the first head belt;*
  *only one buttoning seat coupled to the second head belt and forming a vacancy between the buttoning seat and the second head belt, wherein a through hole is formed in the buttoning seat and wherein the first head belt and the second head belt form a ring when the first head belt is inserted into the vacancy between the buttoning seat and the second head belt,*
  *a movable plate pivotally coupled to the buttoning seat, wherein a clamping key is set up at one end of the movable plate for penetrating the through hole of the buttoning seat and not engaging in a slanted or diagonal direction around an edge of the one of the plurality of vertical buttoning holes, and a spring plate is established at the other end of the movable plate.*

*6. The head belt according to claim 5, wherein said clamping key is adapted to engage and disengage with said plurality of vertical buttoning holes, upon release and pressing, respectively, of the end of movable plate where the spring plate is set up, as said buttoning seat moves away from the end of the second head belt while in a ring configuration.*

*7. The head belt according to claim 5, wherein the first head belt and the second head belt are pivotally connected to the first end and the second end of the fixer of the head magnifying glass, respectively.*

\* \* \* \* \*